United States Patent [19]

Dröscher et al.

[11] Patent Number: 4,728,693

[45] Date of Patent: Mar. 1, 1988

[54] IMPACT-RESISTANT THERMOPLASTIC MOLDING COMPOUNDS BASED ON POLYPHENYLENE ETHERS, POLYOCTENYLENES AND POLYAMIDES

[75] Inventors: Michael Dröscher, Dorsten; Hans Jadamus; Wolfgang Neugebauer, both of Marl; Martin Bartmann, Recklinghausen; Klaus Burzin; Roland Feinauer, both of Marl; Christian Gerth, Haltern; Wilfried Ribbing, Dorsten; Jörg Lohmar, Dortmund, all of Fed. Rep. of Germany

[73] Assignee: Hüls Aktiengesellschaft, Marl, Fed. Rep. of Germany

[21] Appl. No.: 865,968

[22] Filed: May 22, 1986

[30] Foreign Application Priority Data

May 22, 1985 [DE] Fed. Rep. of Germany ....... 3518278
Dec. 20, 1985 [DE] Fed. Rep. of Germany ....... 3545249

[51] Int. Cl.[4] .............................................. C08L 77/00
[52] U.S. Cl. .................................... 525/181; 525/133; 525/149; 525/152; 525/391
[58] Field of Search .............. 525/181, 152, 133, 149, 525/391

[56] References Cited

U.S. PATENT DOCUMENTS 4,315,086 2/1982 Ueno et al. ....................... 525/391

FOREIGN PATENT DOCUMENTS 0181449 6/1985 European Pat. Off. .
58-117250 7/1983 Japan .
85/05372 12/1985 PCT Int'l Appl. .

Primary Examiner—Lewis T. Jacobs
Assistant Examiner—A. Carrillo
Attorney, Agent, or Firm—Oblon, Fisher, Spivak, McClelland & Maier

[57] ABSTRACT

A thermoplastic resin composition, which comprises (a) from 5 to 85 parts by weight of a melted or remelted preliminary molding compound consisting of from 60 to 98 parts by weight of polyphenylene ethers, 40 to 2 parts by weight of polyoctylenes, from 0.1 to 5 parts by weight of maleic anhydride and from 0.1 to 5 parts by weight of a further acid derivative which has a melting point below 100° C. and which is selected from the group consisting of an unsaturated mono- or dicarboxylic acid having up to 14 carbon atoms, an anhydride thereof, which excludes maleic anhydride, and an ester of mono- or dicarboxylic acid with an alcohol of up to 6 carbon atoms; and (b) from 95 to 15 parts by weight of an aliphatic homopolyamide or a copolyamide containing a preponderant amount of aliphatic monomer units.

19 Claims, No Drawings

IMPACT-RESISTANT THERMOPLASTIC MOLDING COMPOUNDS BASED ON POLYPHENYLENE ETHERS, POLYOCTENYLENES AND POLYAMIDES

BACKGROUND OF THE INVENTION

1. Field of the Invention

The present invention relates to a polyphenylene ether based thermoplastic molding resin.

2. Description of the Background

Polyphenylene ethers (PPE) are technical high performance thermoplastic materials which have high melt viscosities and softening points. They are therefore suitable in numerous technical applications in which stability at high temperatures is important (see U.S. Pat. Nos. 3,306,874, 3,306,875, 3,257,357 and 3,257,358). However, certain properties of polyphenylene ethers make the same undesirable in many technical applications. For example, molded parts of polyphenylene ethers are brittle, because of their poor impact resistance.

The high melt viscosities and softening points of PPEs, which lead to processing difficulties, are detrimental. Further, consideration must be given to the fact that polyphenylene ethers tend to be unstable and discolor at high temperatures.

Another characteristic of polyphenylene ethers is that they are soluble in many organic solvents or swell to a large extend. This means that PPEs are unsuitable in applications where they would as a matter of course come into contact with solvents.

Another characteristic of polyphenylene ether resins is that the properties of PPEs can be improved by mixing PPE with other polymers. Thus, e.g., blends of PPE with impact-resistant polystyrenes have attained substantial technical importance (see German Pat. Nos. 2,119,301 and 2,211,005). These resin compounds can be readily processed into molded parts which have sufficient impact-resistance. However, the compounded material has the disadvantage that with increasing polystyrene content, the heat distortion temperature of the blends decreases when tested. These resin blends also, however, have unsatisfactory solvent resistance.

Compound blends of polyphenylene ethers and polyamides exhibit good flowability (see examined German patent application No. 1,694,290 and JP-A No. 7,847,390). However, such resin blends are usually brittle materials, because the two components are incompatible and are poorly dispersable in each other. Aromatic polyamides, such as the types which have been used and which are described, for example, in European unexamined patent application No. 0,131,445, have poor processability with polyphenylene ethers. However, better compatibility of both phases can be achieved by functionalizing the polyphenylene ether component, e.g., with maleic anhydride, in the presence of a radical initiator (J No. 5,906,452). However, the use of a radical initiator leads to an undesirable and uncontrolled partial gelling of the PPE-phase.

In view of the above stated compatability problems of PPE-polyamide, it has been suggested that the compatibility of both polymers can be increased by adding a sufficient quantity of a lubricant such as an organic phosphate (see European unexamined patent application No. 0,129,825) or a diamide (see European unexamined patent application No. 0,115,218) to the resin blends. However, this attempted solution to the problem is not satisfactory, because, although improved compatibility is achieved, the resin blend exhibits considerably reduced heat distortion temperature.

The same disadvantages are characteristic of molding compounds to which copolymers of styrene and unsaturated acid derivatives have been added (see European unexamined patent application No. 0,046,040).

Another reference, which is European Pat. No. 0,024,120, discloses resinous compound blends which are composed of a polyphenylene ether, a polyamide, a third component and, appropriately, a high-molecular caoutchouc polymer. Suitable third components include liquid diene-polymers, epoxy resins or a compound having a double or triple bond and a functional group such as an acid, anhydride, ester, amino or alcohol group. However, the impact resistance of the resinous compound which is obtained is insufficient for many applications. A need therefore continues to exist for a molding composition based on polyphenylene ether which is readily processible and which exhibits improved properties.

SUMMARY OF THE INVENTION

Accordingly, one object of the present invention is to provide a thermoplastic resin composition which provides molded products which have high solvent resistance, high impact resistance and a high heat distortion temperature under heat, and good phase bonding which is recognizable by high elongation values at the point of tearing.

Briefly, this object and other objects of the present invention, as hereinafter will become more readily apparent, can be attained by a thermoplastic resin composition which comprises:

(a) from 5 to 85 parts by weight of a melted or remelted preliminary molding compound consisting of from 60 to 98 parts by weight of polyphenylene ethers, 40 to 2 parts by weight of polyoctenylenes from 0.1 to 5 parts by weight of maleic anhydride and from 0.1 to 5 parts by weight of a further acid derivative which has a melting point below 100° C. and which is selected from the group consisting of an unsaturated mono- or dicarboxylic acid having up to 14 carbon atoms, an anhydride thereof, which excludes maleic anhydride, and an ester of said mono- or dicarboxylic acid with an alcohol of up to 6 carbon atoms; and (b) from 95 to 15 parts by weight of an aliphatic homopolyamide or a copolyamide containing a preponderant amount of aliphatic monomer units.

DETAILED DESCRIPTION OF THE PREFERRED EMBODIMENTS

It was found that a thermoplastic resin composition having very good elongation at tear and notched-bar impact strength can be obtained, if the polyphenylene ether phase is dispersed in such a manner that the volume average of the diameters $D = (\text{Sigma } N_i D_i^4)/(\text{Sigma } N_i D_i^3)$ is smaller than 2 $\mu$m. $D_i$ indicates the diameter of the particles and $N_i$ is the number of particles with the diameter $D_i$.

The process of the present invention for manufacturing thermoplastic resin compositions is characterized by the fact that at first the solid mixture of the polyphenylene ether resin and the polyoctenylene is treated with maleic anhydride and the further acid acid derivative, second the mixture is melted and third the polyamide and optionally the further compounds are added.

A resin composition with high elongation at tear and notched-bar impact strength is obtained, if at least 50 parts by weight of the predescribed melted or remelted preliminary molding compound are employed. The use of maleic anhydride melts, which, because of their inherent property of stimulation eye irritations are physiologically harmful can be avoided according to this invention.

Thermoplastic resin compositions within the scope of the present invention are those thermoplastic resin formulations which can be processed into molded articles or into semiproducts by thermoplastic processing. The thermoplastic resin compositions may be processed in granulate form, for example.

It is of great importance that the molding compound is melted or remelted prior to its use in the thermoplastic compositions.

Suitable polyphenylene ether starting materials include polyethers which are based on 2,6-dimethylphenol, with the ether oxygen of one unit being bonded to the benzene nucleus of the adjacent unit. At least 50 units should be joined together.

In principle, other o,o-dialkylphenols can also be used, whose alkyl residue preferably has a maximum of 6 carbon atoms, with the proviso that such molecules do not contain a tertiary carbon atom in the alkyl groups. However, phenol compounds which are substituted in the alpha position by a tertiary alkyl residue, particularly a tertiary butyl residue, only in one ortho position can also be employed. Each of the monomer phenols mentioned may be substituted by a methyl group in the 3-position, and also in the 5-position. Mixtures of the above mentioned monomer phenols can be used as well.

The polyphenylene ethers can be produced from the phenols, e.g., in the presence of complex-forming agents such as copper bromide and morpholine (see German unexamined patent applications Nos. 3,224,692 and 3,224,691). The viscosity numbers, determined by the procedure of DIN 53 728 in chloroform at 25° C., are in the range from 35 to 80 cm$^3$/g. A preferred PPE is the polymer of 2,6-dimethylphenol, which is poly-(2,6-dimethyl-1,4-phenylene ether) which has a viscosity number of 40 to 70 cm$^3$/g.

The polyphenylene ethers are usually employed in the form of a powder or as granulates.

The polyoctenylene ingredient of the melted or remelted preliminary molding compound is produced by the ring-opening or ring-extending polymerization of cyclo-octene (see, e.g., A. Draxler, Kautschuk + Gummi, Kunststoffe 1981, pages 185 to 190). Polyoctenylenes having different amounts of cis- and trans double bonds, as well as different J-values and correspondingly different molecular weights, are obtainable according to methods known from the literature. Preferred polyoctenylenes are those with a viscosity number of 50 to 350 cm$^3$/g, preferably 80 to 160 cm$^3$/g, as determined in 0.1% solutions in toluene. From 55 to 95%, preferably 75 to 85%, of the double bonds of the polyoctenylenes exist in the trans-form.

Different procedures may be used to produce a mixture of the polyphenlene ether and the polyoctenylene. One procedure is to dissolve both polymers in a suitable solvent, and then the mixture is isolated by evaporation of the solvent or by precipitation of the mixture with a nonsolvent. Another possible procedure is to unite both polymers in a melt. Further details of this procedure can be found in German patent application No. P 3 436 780.2 entitled "Thermoplastic Compounds On The Basis Of Polyphenyl Ethers And Polyoctenylenes, As Well As A Process For Their Production."

The polymer mixture which is obtained by an appropriate procedure is then treated with a mixture of maleic anhydride and the further acid derivative. This is accomplished by diffusing a liquid mixture of both acid materials into the solid melted or remelted preliminary molding compound at temperatures under 100° C., preferably under 50° C., taking care that no sticking of the granules takes place. This is e. g. achieved by portional addition of the acid materials or by large area application. Finally the mixture is remelted at a temperature of 270° to 350° C., preferably 250° to 320° C.

It is very important that the further acid derivative has a melting point under 100° C. Suitable acid derivatives include unsaturated mono- and dicarboxylic acids having up to 14 carbon atoms, their anhydrides, except for maleic anhydride, and esters of the acids with saturated or unsaturated alcohols which have a maximum of 6 carbon atoms. The esters of acrylic acid and of fumaric acid with saturated alcohols are preferred, especially those with n-butanol. A mixture of 0.1 to 5 parts by weight each of maleic anhydride as the acid derivative is used per 100 parts by weight of the sum of the polyphenylene ether and the polyoctenylene.

Homo- and copolymers, preferably of exclusively aliphatic structure, are suitable polyamides. In particular, the 6-, 66-, 612-, 11- and 12-polyamides are preferred. Also suitable, however, are mixed aliphatic-aromatic copolyamides, provided the amount of fundamental aliphatic units in the polyamide is preponderant (see U.S. Pat. Nos. 2,071,250; 2,071,251; 2,130,523; 2,130,948; 2,241,322; 2,312,966; 2,512,606; 3,393,210; Kirk-Othmer, Encyclopedia of Chemical Technology, 18, John Wiley & Sons (1982), pages 328 through 435). The number average molecular weight of the polyamides should be higher than 5,000, preferably higher than 10,000.

The mixing of the polyamide ingredient with the melted or remelted preliminary molding compound is effected by mixing the two melts into a well-kneading aggreagate at a temperature 250° to 350° C., preferably at 270° to 310° C.

It is advantageous to premix the two components while dry and then to extrude them, or to add the polyamide into the melt of the melted or remelted preliminary molding compound.

In mixing the polyamide ingredient with the melted or remelted preliminary molding compound, from 95 to 15 parts by weight of the polyamide are mixed with 5 to 85 parts by weight of the molding compound. Preferred quantities of ingredients are 80 to 50 parts by weight of the polyamide with 20 to 50 parts by weight of the molding compound.

The thermoplastic molding resin composition may additionally contain unmodified or impact-resistant modified polystyrene resins. In order to obtain the desired high heat distortion temperature, the thermoplastic molding resin formulations should contain relatively small amounts of the polystyrene ingredient.

The thermoplastic molding resin composition of the invention may also additionally ingredients as pigments, oligomers and polymers, anti-static agents, stabilizers and auxiliary processing products, as well as reinforcing agents. The amount of the reinforcing agent should be up to 50%, that of the flame retardant up to 15% and that of all the other added substances together up to 5%. In each case the stated quantitites are based on the total quantity of thermoplastic molding resin composition.

Suitable flame retardants include aromatic phosphorus compounds such as triphenylphosphine oxide and triphenylphosphate. Conventional halogen containing flame retarding agents may also be used and these compounds include the halogen containing organic compounds disclosed in the monograph of H. Vogel, "Flammenfestmachen von Kunststoff", Huethig-Verlag. 1966, pages 94 to 102. However, halogenated polymers such as halogenated polyphenylene ethers (see German unexamined patent application No. 3,334,068) or brominated oligo- or polystyrenes can also be considered. The compounds should contain more than 30% by weight halogen.

In the event that a halogen-containing flame retarding agent is employed, it is recommended that a synergist be used. Suitable such synergists include compounds of antimony, boron and tin. In general, they are used in quantities of 0.5 to 10% by weight, based on the amount of thermoplastic molding resin compositions.

Glass and carbon fibers are especially suitable as reinforcing agents.

Suitable stabilizers include organic phosphites such as didecylphenylphosphite and trilaurylphosphite, sterically blocked phenols, as well as tetramethylpiperidine, benzophenone and triazole derivatives.

Suitable auxiliary processing agents include waxes such as oxidized carbohydrates, as well as their alkali metal salts and alkaline earth metal salts.

The thermoplastic molding resin composition obtained can be processed by the processes normally used for the processing of thermoplastics, e.g., injection molding and extrusion, into various molded articles.

Molded objects, which are used in various technical fields of application such as pipes, plates, casings and other technical products for the automotive, electrical and precision mechanics industries can be prepared from the present thermoplastic resin composition.

In contrast to state-of-the-art resins, products prepared from the molding resin of the present invention are distinguished by good high heat distortion temperature and good resistance to solvents. When the present thermoplastic resin composition is molded, it is distinguished by having a high impact resistance.

Having generally described this invention, a further understanding can be obtained by reference to certain specific examples which are provided herein for purposes of illustration only and are not intended to be limiting unless otherwise specified.

The viscosity number (J) of polyphenylene ether is measured in $cm^3/g$ by the procedure of DIN 53 728 at 25° C. in chloroform (concentration 0.5% by weight).

The notched-bar impact strength ($a_k$) of molded objects was measured by the procedure of DIN 53 433 with a rectangular notch at room temperature on standard small bars injection-molded at 290° C.

The elongation at tear (epsilon$_R$) was determined by the procedure of DIN 53 455 on shoulder bars injection-molded at 290° C.

The Vicat softening temperature was determined by the procedure of DIN 53 699 on 4 mm thick molded articles injection-molded at 290° C.

In order to determine the diameter of the polyphenylene ether particles the resin composition is dissolved in hexafluoro isopropanol (HFIP). The floating polyphenylene ether component is washed several times with HFIP, dried and examined in a scanning electron miscroscope (SEM). The mean diameter of the particles was determined by measuring at least one thousand particles from photographic points of SEM exposures.

EXAMPLES

Manufacture and origin of the components:
1. Polyphenylene ether

Polyphenylene ether is obtained by the oxidative coupling of 2,6-dimethylphenol. The reaction is stopped when the desired J-value for the product is obtained, and the product is extracted as described in German unexamined patent application Nos. 3,313,864 and 3,332,377.

EXAMPLE 1.1

A polyphenylene ether having a J-value of 55 $cm^3/g$ is produced by the procedure described above. The solvent is removed by evaporation and the melt is extruded by way of a degassing extruder. The product obtained is granulated and dried.

EXAMPLE 1.2

A polyphenylene ether having a J-value of 55 $cm^3/g$ is produced in the form of a 10% toluene solution.

2. Polyoctenylenes

A polyoctenylene having a J-value of 120 $cm^3/g$ and a trans-content of 80% is used. Such a product is available commercially under the name of VESTENAMER 8012 (manufacturer: HÜLS AKTIENGESELLSCHAFT, D-4370 Marl 1). Additional characteristic data on this product can be found in the periodical "Kautschuk, Gummi, Kunststoffe", 1981, pages 185 to 190, as well as in the Hüls-Data Sheet No. 2247 "VESTENAMER 8012." The polyoctenylene can also be produced by the procedure described in K. J. Ivin "Olefin Metathesis," Academic Press, pages 236 ff., 1983 and in the literature references cited there.

3. Mixture of polyphenylene ethers and polyoctenylene

In the solution described in Example 1.2, the polyoctenylene is dissolved by the procedure of Example 2, with 10 parts by weight of polyoctenylene for every 90 parts by weight of polyphenylene ether. The remaining solvent is removed by means of a degassing extruder, and the product is granulated and dried.

4. Production of the melted or remelted preliminary molding compound

To 2 kg of the mixture according to example 3 a liquid mixture (temperature 50° C.) of the acid derivatives, shown in Table 1 are added in small amounts in a laboratory mixer at room temperature, without sticking of the granules.

In a twin-screw kneading machine, the thusly treated granules are remelted at 290° C. melting temperature, granulated and dried.

TABLE 1

|  | Test 4.1 | Test 4.2 |
| --- | --- | --- |
| Quantity of the mixture of PPE and polyoctenylenes | 2000 g | 2000 g |
| Quantity of maleic anhydride | 20 g | 20 g |
| Further acid derivative | n-butyl acrylate | fumaric acid-di-n-butylester |
| Quantity of the further acid deriv. | 20 g | 20 g |

COMPARATIVE TEST A

To 2 kg of the mixture according to example 3 is added portionally a liquid mixture of 20 g maleic anhydride and 20 g n-butyl acrylate (temperature 50° C.). The reaction mixture is mixed immediately with the polyamide, i.e. without remelting prior to its use.

COMPARATIVE TEST B

A 20 g amount of maleic anhydride is admixed in a twin-screw kneading machine to 2 kg PPE by the procedure of Example 1.1 at a melting temperature of 290° C. The product is subsequently granulated and dried.

COMPARATIVE TEST C

Similar to the procedure of Example B, 20 g maleic anhydride and 10 g dicumyl peroxide are admixed with 2 kg PPE.

5. Molding compositions

The mixtures produced by the procedures described in Examples 4.1, 4.2, A, B and C are mixed with polyamides as described in Table 2, and the resulting mixture is remelted at 290° C. in a twin-screw extruder, the dispersion action of which is reinforced by kneading blocks. The material is then granulated and dried. The product is injection molded into normal bodies and tested.

ULTRAMID® B 4, product of BASF AG, D-6700 Ludwigshafen, is used as a polyamide 6 compound.
ULTRAMID® A 4, a product of BASF AG, D-6700 Ludwigshafen, is used as a polyamide 66 compound.
VESTAMID® L 1900, a product of Hüls AG, D-4370 Marl, is used as a polyamide 12 compound.

Table 2 shows that the values of the elongation at tear as well as the values of the notched-bar impact strength are reduced substantially, if the preform is not remelted (see comparative test A).

if maleic anhydride is employed instead of a mixture of maleic anhydride and a further acid derivative and if PPE is used instead of a mixture of PPE and polyoctenylene.

if an organic peroxide is employed instead of a mixture of maleic anhydride and a further acid derivative.

What is claimed as new and is intended to be secured by Letters Patent is:

1. A thermoplastic resin composition, which comprises:

(a) from 5 to 85 parts by weight of a preliminary molding compound prepared by the melting of a mixture consisting of from 60 to 98 parts by weight of polyphenylene ethers, 40 to 2 parts by weight of polyoctenylenes, from 0.1 to 5 parts by weight of maleic anhydride and from 0.1 to 5 parts by weight of an acid derivative which has a melting point below 100° C. and which is selected from the group consisting of an unsaturated mono- or dicarboxylic acid having up to 14 carbon atoms, an anhydride thereof, which excludes maleic anhydride, and an ester of said mono- or dicarboxylic acid with an alcohol of up to 6 carbon atoms;

(b) from 95 to 15 parts by weight of an aliphatic homopolyamide or a copolyamide containing a preponderant amount of aliphatic monomer units.

2. The thermoplastic resin composition of claim 1, which further comprises:

(c) at least one component selected from the group consisting of polystyrene resins, a flame retardant and compounding additives.

3. The thermoplastic resin composition of claim 1, which comprises (a) from 20 to 50 parts by weight of said preliminary molding compound, and (b) from 80 to 50 parts by weight of said polyamide component.

4. The thermoplastic resin composition of claim 1, wherein said polyamide is 6-, 46-, 66-, 612-, 11- or 12-polyamide.

5. The thermoplastic resin composition of claim 1, wherein the number average molecular weight of said polyamides is higher than 5,000.

6. The thermoplastic resin composition of claim 5, wherein the number average molecular weight is higher than 10,000.

7. The thermoplastic resin composition of claim 1, wherein said polyphenylene ether is a polymer of 2,6-dimethylphenol having an intrinsic viscosity of 0.3 to 0.65 cm$^3$/g.

8. The thermoplastic resin composition of claim 1, wherein said polyoctenylenes have a viscosity number of 50 to 350 cm$^3$/g as determined in a 0.1% solution in toluene.

9. The thermoplastic resin composition of claim 8, wherein said viscosity ranges from 80 to 160 cm$^3$/g.

TABLE 2

Composition and properties of the PPE molding resins

| Test | Compositions (% by Weight) | molding compound according to test | % by weight | Polyamide$^{(a)}$ | $^{a}$K (kJ/m$^2$) | epsilon (%) | Vicat temperature (°C.) B/50 | linear average of the volume distribution of the PPE-particles in the polyamide-matrix in μm |
|---|---|---|---|---|---|---|---|---|
| 5.1 | 40 | 4.1 | 60 | Polyamide 12 | 25 | 58 | 156 | 0,7 |
| 5.2 | 40 | 4.2 | 60 | Polyamide 12 | 20 | 48 | 156 | 0,9 |
| 5.3 | 40 | 4.1 | 60 | Polyamide 6 | 20 | 43 | 195 | 1,2 |
| 5.4 | 40 | 4.1 | 60 | Polyamide 66 | 12 | 56 | 212 | 1,3 |
| D | 40 | A | 60 | Polyamide 12 | 3 | 3 | 159 | 9,7 |
| E | 40 | B | 60 | Polyamide 6 | 4 | 15 | 195 | 6,3 |
| F | 40 | C | 60 | Polyamide 6 | 4 | 8 | 194 | 7,5 |

$^{(a)}$PA 12 = VESTAMID ® L1901 (HULS AG)
PA 6 = ULTRAMID ® B4 (BASF AG)
PA 66 = ULTRAMID ® A4 (BASF AG)

Having now fully described the invention, it will be apparent to one of ordinary skill in the art that many changes and modifications can be made thereto without departing from the spirit or scope of the present invention as set forth herein.

10. The thermoplastic resin composition of claim 1, wherein from 55 to 95% of the double bonds in said polyoctenylene are in the trans configuration.

11. The thermoplastic resin composition of claim 10, wherein from 75 to 85% of said double bonds are in the trans configuration.

12. The thermoplastic resin composition of claim 1, wherein said ester of an unsaturated monocarboxylic acid is a $C_{1-6}$ alkyl ester.

13. The thermoplastic resin composition of claim 12, wherein said ester is n-butylacrylate.

14. The thermoplastic resin composition of claim 1, wherein said ester of an unsaturated dicarboxylic acid is a $C_{1-6}$ alkyl ester of fumaric acid.

15. The thermoplastic resin composition of claim 14, wherein said ester is the di-n-butyl ester of fumaric acid.

16. The thermoplastic resin composition of claim 1, wherein said polyphenylene ether in the form of particles which have a volume average diameter less than 2 μm is dispersed in the polyamide matrix.

17. A process for producing a thermoplastic resin composition, comprising:
   (a) combining a mixture of polyphenylene ethers and polyoctenylenes with maleic anhydride and an acid derivative which has a melting point below 100° C. and which is selected from the group consisting of an unsaturated mono- or dicarboxylic acid having up to 14 carbon atoms, an anhydride thereof, which excludes maleic anhydride, and an ester of said mono- or dicarboxylic acid with an alcohol of up to 6 carbon atoms;
   (b) melting the mixture obtained; and then
   (c) adding a polyamide which is an aliphatic homopolyamide or a copolyamide containing a preponderant amount of aliphatic monomer units to said melt.

18. The process of claim 17, wherein a liquid mixture of maleic anhydride and the acid derivative is diffused into the solid mixture of polyphenylene ether and said polyoctenylene at a temperature below 100° C.

19. The process of claim 18, wherein said temperature is below 50° C.

* * * * *